(12) United States Patent
Tanino et al.

(10) Patent No.: US 8,885,684 B2
(45) Date of Patent: Nov. 11, 2014

(54) GAS LASER DEVICE

(75) Inventors: Yoichi Tanino, Tokyo (JP); Junichi Nishimae, Tokyo (JP); Tatsuya Yamamoto, Tokyo (JP); Shuichi Fujikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/123,903

(22) PCT Filed: Jun. 20, 2011

(86) PCT No.: PCT/JP2011/064014
§ 371 (c)(1),
(2), (4) Date: Dec. 4, 2013

(87) PCT Pub. No.: WO2012/176253
PCT Pub. Date: Dec. 27, 2012

(65) Prior Publication Data
US 2014/0112362 A1    Apr. 24, 2014

(51) Int. Cl.
| | | |
|---|---|---|
| *H01S 3/22* | (2006.01) | |
| *H01S 3/041* | (2006.01) | |
| *H01S 3/036* | (2006.01) | |
| *H01S 3/03* | (2006.01) | |
| H01S 3/223 | (2006.01) | |
| H01S 3/0971 | (2006.01) | |
| H01S 3/07 | (2006.01) | |
| H01S 3/081 | (2006.01) | |

(52) U.S. Cl.
CPC ............ *H01S 3/041* (2013.01); *H01S 3/2232* (2013.01); *H01S 3/0971* (2013.01); *H01S 3/076* (2013.01); *H01S 3/0816* (2013.01); *H01S 3/036* (2013.01); *H01S 3/081* (2013.01); *H01S 3/03* (2013.01)
USPC .................. 372/55; 372/34; 372/58; 372/68; 372/69; 372/98

(58) Field of Classification Search
CPC ........... H01S 3/081; H01S 3/03; H01S 3/036; H01S 3/041; H01S 3/076; H01S 3/0816; H01S 3/0971; H01S 3/2232
USPC .................................... 372/55, 58, 68, 69, 98
See application file for complete search history.

(56) References Cited

U.S. PATENT DOCUMENTS

| | | | |
|---|---|---|---|
| 4,598,407 A | 7/1986 | Hayashi | |
| 5,148,443 A | 9/1992 | Du et al. | |

(Continued)

FOREIGN PATENT DOCUMENTS

| | | |
|---|---|---|
| JP | 60 28288 | 2/1985 |
| JP | 4 501036 | 2/1992 |

(Continued)

OTHER PUBLICATIONS

Ariga, T., et al., "High Power Pulsed CO2 Laser for EUV Lithography", Proceedings of SPIE, vol. 6151, Total 8 pages, (Feb. 21, 2006).

(Continued)

*Primary Examiner* — Yuanda Zhang
(74) *Attorney, Agent, or Firm* — Oblon, Spivak, McClelland, Maier & Neustadt, L.L.P.

(57) ABSTRACT

A $CO_2$ gas laser device according to the present invention amplifies $CO_2$ laser light that oscillates repeatedly in short pulses having a pulse width of 100 ns or less, and cools a CO2 laser gas which is excited by continuous discharge by circulating the CO2 laser gas by means of forced convection. Therein, an angle θ defined by the optical axis of the amplified $CO_2$ laser beam and the flow direction of the $CO_2$ laser gas caused by the forced convection is determined by both a discharge cross sectional area and a discharge length of a volume in which the $CO_2$ laser gas is excited by discharge, whereby increasing the gain of pulsed laser to achieve pulsed laser light having an extremely high average output power.

3 Claims, 4 Drawing Sheets

(56) References Cited

U.S. PATENT DOCUMENTS

| | | | |
|---|---|---|---|
| 5,303,254 A | 4/1994 | Szatmari | |
| 2001/0001003 A1* | 5/2001 | Ozu | 372/34 |
| 2009/0141251 A1* | 6/2009 | Kim et al. | 353/82 |
| 2009/0232171 A1* | 9/2009 | Abe et al. | 372/25 |
| 2010/0195196 A1 | 8/2010 | Nowak et al. | |

FOREIGN PATENT DOCUMENTS

| | | |
|---|---|---|
| JP | 5 90680 | 4/1993 |
| JP | 5 136488 | 6/1993 |
| JP | 2001 15836 | 1/2001 |
| JP | 2003 92199 | 3/2003 |
| JP | 2007 221053 | 8/2007 |
| JP | 2009 246345 | 10/2009 |
| JP | 2010 186990 | 8/2010 |
| TW | 200536219 | 11/2005 |

OTHER PUBLICATIONS

Brandt, D. C., et al., "LPP EUV Source Development for HVM", Proceedings of the SPIE, vol. 6517, Total 10 pages, (2007).

Kuzumoto, M., et al., "Practical Model for Gas Temperature Effects on Cot Lasers", IEEE Journal of Quantum Electronics, vol. 27, No. 3, pp. 471-475, (Mar. 1991).

International Search Report Issued Jul. 12, 2011 in PCT/JP11/064014 Filed Jun. 20, 2011.

International Preliminary Report on Patentability and Written Opinion issued Jan. 9, 2014, in International application No. PCT/JP2011/064014.

Office Action issued Jul. 21, 2014 in Taiwanese Patent Application No. 100125938 (with partial English Translation).

\* cited by examiner

GAS LASER DEVICE

TECHNICAL FIELD

The present invention relates to a pulsed laser technology using a laser gas containing carbon dioxide ($CO_2$).

BACKGROUND

In an amplifier for producing short-pulse $CO_2$ laser light having a pulse width of 100 ns or less, a $CO_2$ laser gas which is excited by continuous-wave (CW) discharge is cooled by means of forced convection, and the direction of the gas flow caused by the forced convection is substantially the same as that of the optical axis of the laser light to be amplified (See, e.g., Patent Document 1). In other words, a high-speed axial flow type of carbon dioxide gas laser has been conventionally used (See, e.g., Non-patent Document 1).

In the high-speed axial flow type of $CO_2$ gas laser, a laser gas is excited inside a cylindrical discharge tube. The laser gas is flown from one end to the other end of the cylindrical tube. The optical axis of the laser light is also set in parallel with the central axis of the cylindrical tube. In other words, the direction of the laser gas flow is arranged in parallel with the optical axis. The direction of the laser gas flow refers to a direction in which most of the laser gas flows among the laser gas present in a discharge region defined by the shape of discharge electrodes. Henceforth, unless otherwise stated, the direction of the gas flow will refer to the above-described meaning.

In case of using the $CO_2$ gas laser as an amplifier, it only needs to replace the resonator mirrors with windows. In other words, laser light generated from an oscillator is amplified by the laser gas excited in the amplifier. The laser gas cools the $CO_2$ laser gas by forced convection and the direction of the gas flow caused by the forced convection is substantially the same as that of the optical axis of the laser light to be amplified.

In Patent Document 1, a pulse $CO_2$ laser with an output power of 10 W is arranged at an oscillation stage and two continuous wave (CW) $CO_2$ lasers are arranged at an amplification stage. The pulse $CO_2$ laser at the oscillation stage can generate pulsed light at a high repetition frequency (for example, 100 kHz). In this example, the pulse $CO_2$ laser at the oscillation stage operates in a single-transverse mode to generate a laser beam having a wavelength around 10 μm. The pulsed light having a lower power generated from the pulse $CO_2$ laser at the oscillation stage enters the CW—$CO_2$ lasers at the amplification stage, and then is amplified while traveling through the $CO_2$ gas laser, so that a laser beam having good convergence and a higher energy is produced from the CW—$CO_2$ lasers at the amplification stage.

Also, it is demonstrated that when two 5 kW rated lasers and one 15 kW rated laser as oscillators are connected in series to amplify a pulsed laser having an average input power of 10 W and a pulse width of 15 ns, the amplified pulse has an average output power of about 2 kW (See, e.g., Non-patent Document 2).

PRIOR ART DOCUMENT

Patent Document

[Patent Document 1] JP 2003-92199 A
[Patent Document 2] JP 60-028288 A (1985)

Non-Patent Document

[Non-patent Document 1] Igor V. Fomendov, et al., Proceedings of the SPIE, Volume 6517, 65173J, 2007, Section 2
[Non-patent Document 2] Tatsuya Ariga, et al., Proceedings of the SPIE, Volume 6151, 61513M, 2007, Section 3.2
[Non-patent Document 3] M. Kuzumoto, et al., IEEE Journal of Quantum Electronics, Vol. 27, No. 3, p. 471 (1991)

SUMMARY OF THE INVENTION

Problem to be Solved by the Invention

Conventional $CO_2$ laser amplifiers have a smaller gain for pulsed laser light. The present invention is directed to provide a $CO_2$ laser device which has a larger gain for pulsed laser light. Specifically, the present invention is directed to provide an amplifier which is configured with one 5 kW rated $CO_2$ laser as an oscillator so that it can amplify pulsed laser light having a pulse width of 10 ns order, a repetition frequency of 100 kHz, and an average output power of 10 W to obtain the amplified pulse having an average output power of more than 2 kW.

Further, the inventor has found that the laser gas is apt to be heated in the conventional amplifiers, since the laser gas flow is almost in parallel with the optical axis and, accordingly, the laser gas flows along the long side of the discharge region. Typically, the temperature of the laser gas rises by about 100 degrees.

Means for Solving the Problem

Then, the present invention provides a $CO_2$ gas laser device for amplifying $CO_2$ laser light which repeatedly oscillates in a short pulse having a pulse width of 100 ns or less to suppress temperature rise of the laser gas by cooling the $CO_2$ laser gas, wherein an angle $\theta$ defined by an optical axis of the amplified $CO_2$ laser light and a flow direction of the $CO_2$ laser gas caused by forced convection (wherein the angle $\theta$ can be defined between 0 and 90 degrees) is determined by both a discharge cross sectional area and a discharge length of a volume in which the $CO_2$ laser gas is excited by discharge.

Particularly, in the present invention, by setting both of the optical axis of the amplified $CO_2$ laser light and the flow direction of the forced convection so that they intersect with each other at an angle equal to or larger than the predetermined angle which is determined by both the discharge cross sectional area and the discharge length, the laser gas is likely to flow along the short side of the discharge region (the criterion for judging whether the laser gas flows along the short side is that the transverse length of the discharge region through which the laser gas flows is smaller than a cube root of the volume of the discharge region), thereby suppressing the temperature rise of the laser gas in comparison with the conventional art (the temperature rise can be estimated at tens of degrees).

As the temperature of the gas of the laser medium rises, a small signal gain of the laser medium falls (the small signal gain is defined as an amplification factor per unit length in the case where the input power is as close to zero as possible; for example, when laser light having an input power of 10 W is amplified by using the kW-class laser as in the case of the present context, it may be considered that the magnitude of the amplification factor is determined by the magnitude of the small signal gain). For example, the small signal gain of the laser medium is in inverse proportion to 2.5 power of the temperature of the medium gas in the $CO_2$ laser (See FIG. 2 in Non-patent Document 3). Thus, it is preferable that the temperature rise of the medium gas is smaller in the gas laser.

As described above, by setting both of the optical axis of the amplified $CO_2$ laser light and the flow direction of the forced convection so that they intersect with each other at an angle equal to or larger than the predetermined angle which is determined by both the discharge cross sectional area and the discharge length, the temperature rise of the laser gas can be suppressed. Therefore, it is an object of the present invention to provide a $CO_2$ laser device which has a larger gain (for example, the amplifier of the present invention is configured with a CO2 laser medium having an output power rated 5 kW as an oscillator so that it amplifies pulsed laser light having a pulse width of 10 ns order, a repetition frequency of 100 kHz, and an average output power of 10 W to obtain the amplified pulse having an average output power of more than 2 kW).

Effect of the Invention

The present invention can provide a device having a larger gain for pulsed laser light. For example, the present invention has an advantage in that the amplifier of the present invention can be configured with a rated 5 kW $CO_2$ laser medium as an oscillator provided with proper resonator mirrors so that it can amplify pulsed laser light having a pulse width of 10 ns order, a repetition frequency of 100 kHz, and an average output power of 10 W to obtain the amplified pulse having an average output power of more than 2 kW.

EMBODIMENT FOR CARRYING OUT THE INVENTION (Embodiment 1)

Figure 1:
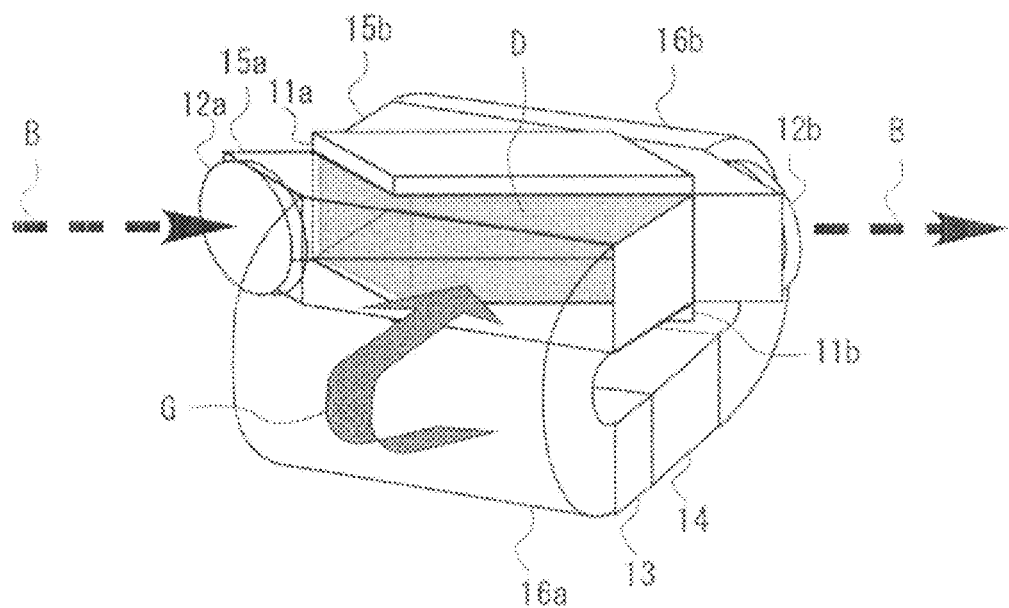
FIG. 1 is a perspective view of a pulsed $CO_2$ laser amplifier according to Embodiment 1 of the present invention.

A perspective view of a pulsed $CO_2$ laser amplifier according to the present invention is illustrated in FIG. 1.

In FIG. 1, discharge electrodes include an upper discharge electrode 11a and a lower discharge electrode 11b. Duct and window holders 15a and 15b are attached to the upper and lower discharge electrodes 11a and 11b, respectively. A duct 16b is attached to the duct and window holder 15b. A heat exchanger 14 is attached to the duct 16b. A blower 13 is attached to the heat exchanger 14. A duct 16a is attached to the blower 13. A window 12a on the side of pulse input is attached to the duct and window holder 15a, and a window 12b on the side of pulse output is attached to the duct and window holder 15b.

In FIG. 1, a laser gas is excited by discharge in a substantially continuous-wave (CW) manner within a discharge region D which is determined by a pair of the discharge electrodes 11a and 11b. The discharge excitation is performed by applying an AC voltage between the discharge electrodes 11a and 11b.

A pulsed $CO_2$ laser amplifier according to this embodiment amplifies pulsed $CO_2$ laser light having a pulse width of 10 ns order.

When the laser gas is excited by discharge, the temperature of the laser gas rises due to collision between molecules and electrons. In order to maintain normal operation of the laser, the temperature of the laser gas needs to be kept under a certain degree. For this purpose, the laser gas is circulated by means of forced convection using the blower 13 and cooled by the heat exchanger 14. A flow channel of the forced convection runs through the duct and window holders 15a and 15b and the ducts 16a and 16b. The laser gas sent from the blower 13 flows through the inside of the duct 16a, the duct and window holder 15a, the discharge region defined by the discharge electrodes 11a and 11b, the duct and window holder 15b, the inside of the duct 16b, and the heat exchanger 14 in this order to return back to the blower 13.

The window 12a on the side of pulse input is held on the duct and window holder 15a and the window 12b on the side of pulse output is held on the duct and window holder 15b, respectively.

The laser gas is sealed in a room which is enclosed by the blower 13, the heat exchanger 14, the discharge electrodes 11a and 11b, the ducts 16a and 16b, the window holders 15a and 15b, and the windows 12a and 12b at a pressure of about 50 Torr.

In this embodiment, the direction of the gas flow G caused by forced convection in the discharge excitation volume is set to be different from that of the optical axis of the amplified laser light B.

In the pulsed $CO_2$ laser amplifier configured as above, the pulsed $CO_2$ laser light having a pulse width of 10 ns order is introduced through the window 12a into the discharge region D which is defined by the discharge electrodes 11a and 11b. The pulsed laser light B is amplified in the discharge region D and then extracted through the window 12b.

In the pulsed $CO_2$ laser amplifier configured as above, temperature rise of the laser gas can be more surely suppressed in comparison with conventional amplifiers. The reason will be described below.

Figure 2:
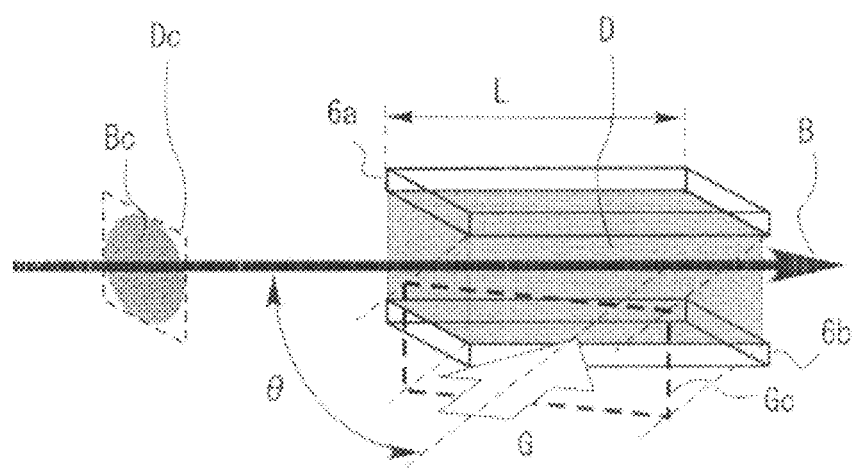
FIG. 2 is an illustration of functional parts of the pulsed $CO_2$ laser amplifier according to Embodiment 1 of the present invention.

FIG. 2 illustrates the periphery of the discharge region of the amplifier (shown in FIG. 1) according to the present invention, wherein respective lengths and areas can be defined. In the discharge region, the length L of the optical axis (discharge length), the cross sectional area $S_D$ perpendicular to the optical axis, i.e., the area of the discharge cross sectional area (equal to the discharge cross sectional area), a cross sectional area $S_r$ of the laser beam, a cross sectional area S of the gas flow channel for the laser gas flow, and an angle θ defined by the optical axis and the gas flow (here, the direction of the laser gas flow) (wherein the angle θ can be defined between 0 degrees and 90 degrees) are parameterized.

Now, the configuration of the present invention is compared with a conventional configuration in terms of temperature rise of the laser gas when the regions for amplifying the laser beam are input with the same discharge power $W_{di}$.

First, in the case of the configuration according to the present invention, it is assumed that the region for amplifying the laser beam (the columnar region of the cross sectional area $S_r$ of the laser beam×the discharge length L) is input with the discharge power $k_{id}$ in FIG. 2. In this figure a shape Dc and an area $S_D$ of the discharge cross section, and a shape Gc and an area S of the cross section of the gas flow channel are parameterized.

In the following discussion, in order to secure a gas flow channel as efficiently as possible, it is assumed that the amplifier operates with the discharge space having a rectangular parallelepiped shape and the circular laser beam having a diameter which is substantially equal to the length of the side of the discharge cross section, i.e., the cross section of the laser beam: $S_r \approx (\pi/4) \times$ the discharge cross sectional area $S_D$ by way of example of ensuring efficient amplification without wasting the discharge power.

In order to ensure efficient amplification without wasting the discharge power, the ratio of the volume of the laser beam to the discharge volume is preferably as close to 100% as possible. If the laser beam has a shape of square corresponding to the discharge cross section, the ratio of the volume of the laser beam to the discharge volume is 100%, resulting in a configuration with least waste of the discharge power.

On the other hand, it requires an expensive optical system to transform a circular laser beam emitted from the oscillator into a square laser beam, it is unrealistic to amplify such a square laser beam. Therefore, the following discussion will be based on the condition that the laser beam has a circular shape so as to maximize the ratio of the volume of the laser beam to the discharge volume as described above.

Since the discharge electric field is uniformly formed in the discharge volume in case of laser discharge, by using the discharge power $W_d$ supplied to the whole discharge volume (the rectangular parallelepiped of the discharge cross sectional area $S_D$×the discharge length L), the following equation can be established:

$$W_{di} = (\pi/4) \times W_d \quad \text{(Equation 1)}$$

Where the flow rate of the gas is Q [m³/s], the volumetric specific heat of the gas is C [J/m³K], and temperature rise of the gas during passing through the discharge electric field is ΔT [K], generally, the following equation is established:

$$W_d = C \cdot Q \cdot \Delta T \quad \text{(Equation 2)}$$

Further, as for the gas flow rate, the following equation is established:

$$Q = S \cdot v \quad \text{(Equation 3)}$$

wherein S is the cross section of the gas flow channel [m²] and v is the gas flow speed [m/s]. Further, the following equation is also established:

$$S = \text{sqrt}(S_D) \cdot L \cdot \sin \theta \quad \text{(Equation 4)}$$

wherein sqrt( ) means a square root, which applies hereinafter. From the above Equations 1 to 4, the temperature rise of the gas is expressed as follows:

$$\Delta T = (\pi/4) \cdot W_{di}/(C \cdot \text{sqrt}(S_D) \cdot L \cdot v \cdot \sin \theta) \quad \text{(Equation 5)}$$

Figure 3:
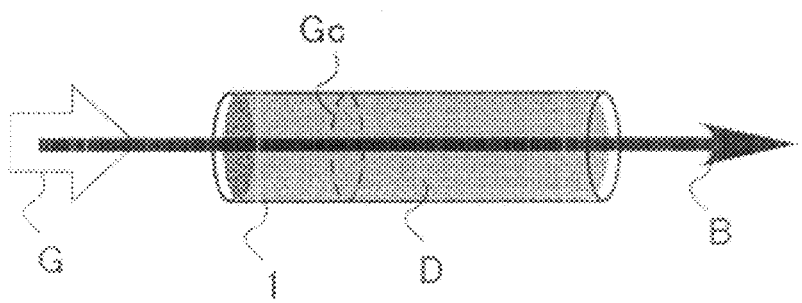
FIG. 3 is a perspective view illustrating an example of a typical pulsed $CO_2$ laser amplifier.

On the other hand, by way of example of conventional general amplifier of FIG. 3, it is also assumed that the region for amplifying the laser beam (the columnar region of the cross sectional area $S_r$ of the laser beam×the discharge length L) is input with the discharge power $W_{di}$. In this figure, the area S (shape Gc) of the cross section of the gas flow channel is equal to the area $S_D$ of the discharge cross section (shape Gc) and almost equal to the cross section $S_r$ of the laser beam.

In the following discussion, by way of example of ensuring as efficient amplification as possible, it is assumed that the circular laser beam substantially corresponds to the discharge cross section, i.e., $S_r = S_D$.

By using the discharge power $W_d$ supplied to the whole discharge volume (the column of the discharge cross sectional area $S_D$×the discharge length L), the following equation can be established:

$$W_{di} = W_d \quad \text{(Equation 6)}$$

Further, the following equation is also established:

$$W_d = C \cdot Q \cdot \Delta T \quad \text{(Equation 2)}$$

As for the gas flow rate, the laser gas flows through the discharge tube in substantially parallel with the optical axis, the following equation is established:

$$Q = S \cdot v = S_D \cdot v \quad \text{(Equation 3a)}$$

From Equations 6, 2 and 3a, the temperature rise of the gas is expressed as follows:

$$\Delta T = W_{di}/(C \cdot S_D \cdot v) \quad \text{(Equation 7)}$$

Figure 4:
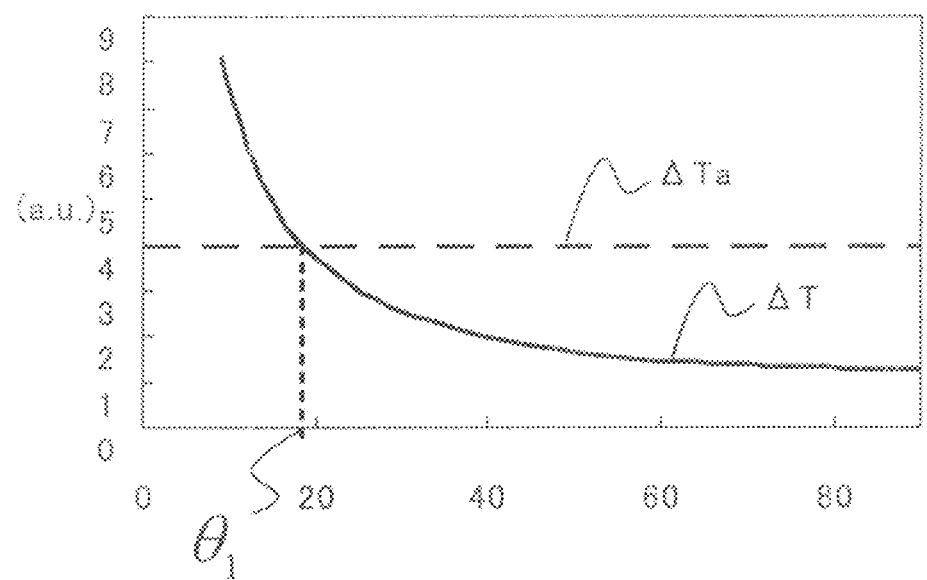
FIG. 4 is a graph showing comparison in temperature rise of laser gas between conventional and inventive pulsed $CO_2$ laser amplifiers.

The graph of FIG. 4 shows a summary of the temperature rise of the gas in the conventional example (Equation 7) and the temperature rise of the gas in the present invention (Equation 5). In the graph of FIG. 4, the axis of abscissas shows an angle (unit: degree) defined by the optical axis of the laser and the direction of the gas flow and the axis of ordinate shows the temperature rise of the laser gas (arbitrary scale). The dashed line $\Delta T_a$ indicates the temperature rise of the gas in the conventional example and the solid line ΔT indicates the temperature rise of the gas in the present invention.

When comparing the temperature rise of the gas in the conventional example (Equation 7) with the temperature rise of the gas in the present invention (Equation 5), it is understood that when the direction of the laser gas flow channel is arranged to be different from that of the amplified laser beam by an angle shown by the following (Equation 8), the temperature rise of the laser gas can be suppressed smaller than in the conventional example even in a case where the region for amplifying the laser beam is input with the same discharge power as in the conventional example (see FIG. 4).

$$\theta \geq \arcsin(4/\pi \times \text{sqrt}(S_D)/L) \quad \text{(Equation 8)}$$

Note that the right-hand side of (Equation 8) showing an angular threshold is illustrated as $\theta_1$ in FIG. 4.

As the temperature of the gas of the laser medium rises, the small signal gain of the laser medium falls. Therefore, the present invention can provide the pulsed $CO_2$ laser amplifier having a larger value of the small signal gain of the laser medium. In the configuration according to the present invention, the small signal gain of the laser medium is about 3 (1/m).

As an example, when the amplifier according to the present invention is configured with a $CO_2$ laser medium rated 5 kW as an oscillator so that it can amplify pulsed laser light having a pulse width of 10 ns order, a repetition frequency of 100 kHz, and an average output power of 10 kW, thereby increasing the output power of the pulsed laser beam by 4 kW to achieve 14 kW for the average output power of the amplified pulse.

More specifically, in case of the discharge cross sectional area $S_D = 5$ cm×5 cm and the discharge length L=20 cm, by setting the angle θ defined by the direction of the gas flow caused by the forced convection and the optical axis of the amplified laser beam at 19 degrees or more, the pulsed $CO_2$ laser amplifier can has amplification performance superior to that of the conventional art. Further, when the angle θ is 90 degrees, it has the most effective configuration.

(Embodiment 2)

Embodiment 2 will be described below with reference to FIG. 5.

A pulsed $CO_2$ laser amplifier according to Embodiment 2 amplifies pulsed $CO_2$ laser light having an average output power of 10 W and a pulse width of 10 ns. In FIG. 5, the discharge electrodes include an upper discharge electrode 21a and a lower discharge electrode 21b. Duct and window holders 25a and 25b are attached to the upper and lower discharge electrodes 21a and 21b, respectively. A duct 26b is attached to the duct and window holder 25b. A heat exchanger 24 is attached to the duct 26b. A blower 23 is attached to the heat exchanger 24. A duct 26a is attached to the blower 23. A window 22a and a mirror 27a on the side of pulse input is attached to the duct and window holder 25a, and a window 22b and a mirror 27b on the side of pulse output is attached to the duct and window holder 25b.

Figure 5:
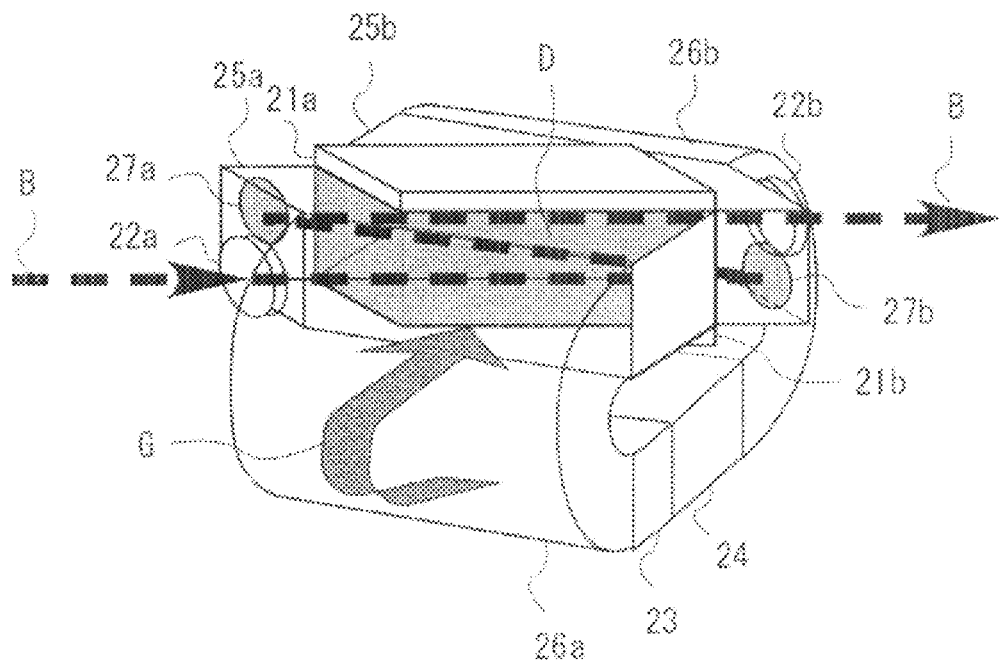
FIG. 5 is a perspective view of a pulsed $CO_2$ laser amplifier according to Embodiment 2 of the present invention.

In FIG. 5, the discharge electrodes 21a and 21b, the windows 22a and 22b, the blower 23, the heat exchanger 24, the duct and window holders 25a and 25b, and the ducts 26a and 26b are the same as those of Embodiment 1, hence descriptions thereof will be omitted. The mirrors 27a and 27b are arranged to fold the path of the pulsed laser light B which is introduced into the discharge region between the discharge electrodes 21a and 21b.

Also in Embodiment 2, the direction of the gas flow G caused by forced convection is arranged to be different from that of the optical axis of the amplified laser light.

In the pulsed $CO_2$ laser amplifier configured as above, the pulsed $CO_2$ laser light having a pulse width of 10 ns order is introduced through the window 22a into the discharge region. The pulsed laser light B is sequentially folded by the mirrors 27a and 27b to travel along a Z-shaped path. The pulsed $CO_2$ laser light is amplified in the discharge region between the discharge electrodes 21a and 21b while traveling along the Z-shaped path, and then extracted through the window 22b to the outside of the housing.

Figure 7:
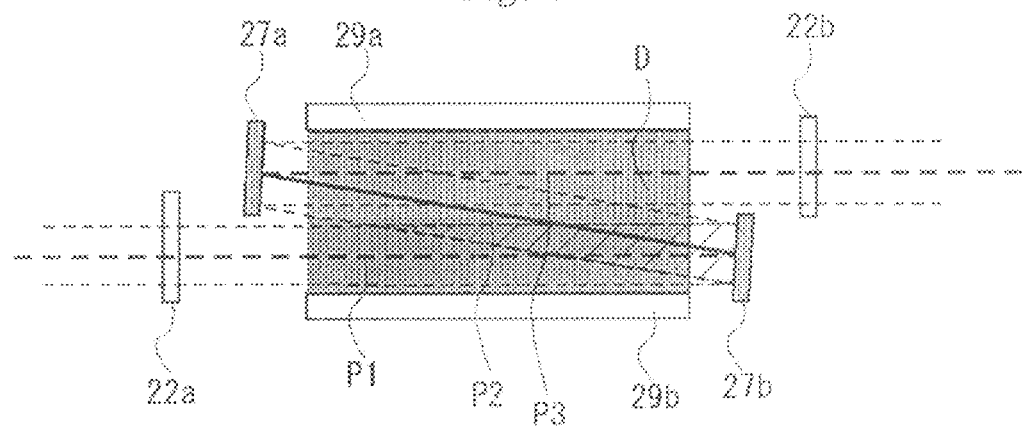
FIG. 7 is another illustration of functional parts of the pulsed $CO_2$ laser amplifier according to Embodiment 2 of the present invention.

FIG. 7 illustrates a function explanatory diagram according to Embodiment 2 of the present invention. The above described configuration includes an optical path 1 extending from the window 22a to the mirror 27b, an optical path 2 extending from the mirror 27b to the mirror 27a, and an optical path 3 extending from the mirror 27a to the window 22b. In FIG. 7, bold dashed lines P1 and P3 or a bold solid line P2 indicate the center lines of the laser beams in the respective optical paths and thin dashed lines indicate radius positions of the laser beams (outer edges of the laser beam regions) in the respective optical paths. The optical path 1 and the optical path 2 share the same space in the hatching part, and the optical path 2 and the optical path 3 also share the same space in a certain part. The optical path 1 and the optical path 3 do not share the same space. In the above described configuration, the optical path length corresponding to the respective optical paths in the hatching part (occupying the hatching part) is shorter than the optical path length of the respective optical paths in the part other than the hatching part (occupying the part other than the hatching part). In the above description, the optical path length refers to the length of the center lines of the laser beams of the respective optical paths.

In the pulsed $CO_2$ laser amplifier configured as above, temperature rise of the laser gas can be more surely suppressed in comparison with conventional amplifiers. The reason will be described below.

Figure 6:
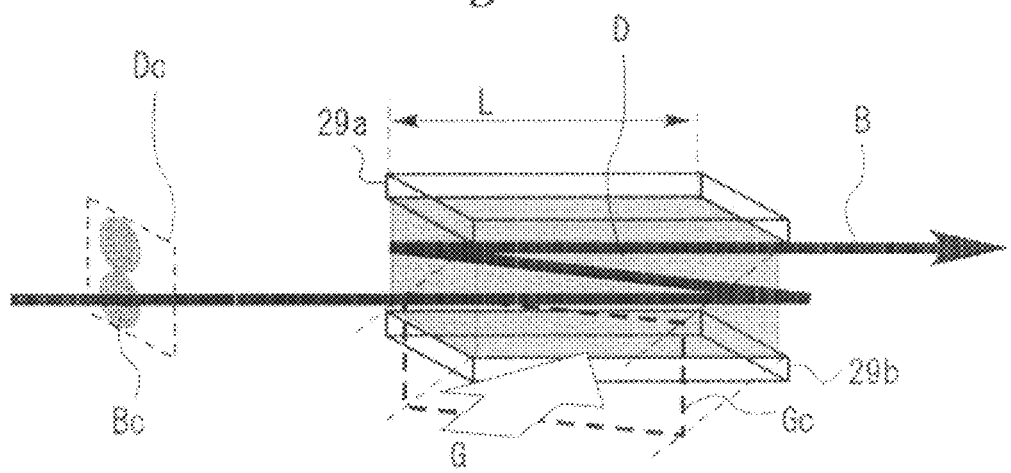
FIG. 6 is an illustration of functional parts of the pulsed $CO_2$ laser amplifier according to Embodiment 2 of the present invention.

FIG. 6 illustrates the periphery of the discharge region of the amplifier (shown in FIG. 5) according to the present invention, wherein respective lengths and areas can be defined. The cross section of the discharge region which is cut away at a plane perpendicular to the optical path is shown in the left side of FIG. 6 with the discharge cross section (shape Dc and area $S_D$ of the discharge cross section) and the laser beam cross section (shape Bc and area $S_r$ of the laser beam cross section).

In the amplifier according to the present invention (see FIG. 6), it is assumed that the region for amplifying the laser beam (2×the column of the cross sectional area $S_r$ of the laser beam×the discharge length L) is input with the discharge power $W_{di}$. For stable discharging, the shape of the discharge cross section (area $S_D$) may be square. In the following discussion, it is assumed that the amplifier operates with the circular laser beams in substantially contact with the upper end and the lower end of the discharge cross section (see FIG. 6), i.e., the cross section of the laser beam: $S_r \approx (\pi/8) \times$ the discharge cross sectional area (the area of the discharge cross section) $S_D$ by way of example of ensuring efficient amplification without wasting the discharge power.

Since the discharge electric field is uniformly formed in the discharge volume in case of laser discharge, by using the discharge power $W_d$ supplied to the whole discharge volume (the rectangular parallelepiped of the discharge cross sectional area $S_D \times$ the discharge length L), the following equation can be established:

$$W_{di} = (\pi/8) \times W_d \quad \text{(Equation 1a)}$$

Where the flow rate of the gas is Q [m³/s], the volumetric specific heat of the gas is C [J/m³K], and temperature rise of the gas during passing through the discharge electric field is ΔT [K], generally, the following equation is established:

$$W_d = C \cdot Q \cdot \Delta T \quad \text{(Equation 2)}$$

Further, as for the gas flow rate, the following equation is established:

$$Q = S \cdot v \quad \text{(Equation 3)}$$

wherein S is the cross section of the gas flow channel [m²] and v is the gas flow speed [m/s]. Further, the following equation is also established:

$$S = \text{sqrt}(S_D) \cdot L \cdot \sin \theta \quad \text{(Equation 4)}$$

From the above Equations 1a to 4, the temperature rise of the gas is expressed as follows:

$$\Delta T = (8/\pi) \cdot W_{di} / (C \cdot \text{sqrt}(S_D) \cdot L \cdot v \cdot \sin \theta) \quad \text{(Equation 5a)}$$

On the other hand, by way of example of conventional general amplifier (see FIG. 3), it is also assumed that the region for amplifying the laser beam (the columnar region of the cross sectional area $S_r$ of the laser beam ×the discharge length L) is input with the discharge power $W_{di}$. In the following discussion, by way of example of ensuring as efficient amplification as possible, it is assumed that the circular laser beam substantially corresponds to the discharge cross section, i.e., $S_r = S_D$.

By using the discharge power $W_d$ supplied to the whole discharge volume (the column of the discharge cross sectional area $S_D \times$ the discharge length L), the following equation can be established:

$$W_{di} = W_d \quad \text{(Equation 6)}$$

Further, the following equation is also established:

$$W_d = C \cdot Q \cdot \Delta T \quad \text{(Equation 2)}$$

As for the gas flow rate, the laser gas flows through the discharge tube in substantially parallel with the optical axis, the following equation is established:

$$Q = S \cdot v = S_D \cdot v \quad \text{(Equation 3a)}$$

From Equations 6, 2 and 3a, the temperature rise of the gas is expressed as follows:

$$\Delta T = W_{di}/(C \cdot S_D \cdot v) \quad \text{(Equation 7)}$$

When comparing the temperature rise of the gas in the conventional example (Equation 7) with the temperature rise of the gas in this embodiment (Equation 5a), it is understood that when the direction of the laser gas flow channel is arranged to be different from that of the amplified laser beam by an angle shown by the following (Equation 8a), the temperature rise of the laser gas can be suppressed smaller than in the conventional example even in a case where the region for amplifying the laser beam is input with the same discharge power as in the conventional example.

$$\theta \geq \arcsin(8/\pi \times \mathrm{sqrt}(S_D)/L) \quad \text{(Equation 8a)}$$

As the temperature of the gas of the laser medium rises, the small signal gain of the laser medium falls. Therefore, the present invention can provide the pulsed $CO_2$ laser amplifier having a larger value of the small signal gain of the laser medium.

For example, when the amplifier according to the present invention is configured with a $CO_2$ laser medium rated 5 kW as an oscillator so that it can amplify pulsed laser light having a pulse width of 10 ns order, a repetition frequency of 100 kHz, and an average output power of 10 W to achieve 2 kW for the average output power of the amplified pulse.

More specifically, in case of the discharge cross sectional area $S_D = 5$ cm×5 cm and the discharge length $L = 20$ cm, by setting the angle $\theta$ defined by the direction of the gas flow caused by the forced convection and the optical axis of the amplified laser beam at 40 degrees or more, the pulsed $CO_2$ laser amplifier can has amplification performance superior to that of the conventional art. Further, when the angle $\theta$ is 90 degrees, it has the most effective configuration.

Further, in the case of the input having such a relatively small power as an average output power of 10 W order with a pulse width of 10 ns order and a repetition frequency of 100 kHz, the amplifier has a gain of $g_0$ ($g_0$=small signal gain per unit length)×(interaction length between the laser beam and the medium). Therefore, the interaction length between the laser beam and the medium can be extended by allowing the laser beam to pass through different positions of the same medium twice or more. Consequently, the amplifier can amplify a laser beam having a relatively small power more efficiently than in the conventional method.

In other words, the present invention has an advantage that even in case where the region for amplifying the laser beam can be input with a power higher than in the conventional method,
a laser beam having a relatively small power can be amplified more efficiently than in the conventional method.

Although the pulsed $CO_2$ laser light is amplified along the Z-shaped path in the above described embodiment, the pulsed $CO_2$ laser light may be amplified along a folded path having a shape other than the Z-shape. Further, a plurality of pulsed laser beams may be prepared in front of the amplifier and amplified in parallel through the amplifier. Thus, the above configuration with a folded path having a shape other than the Z-shape and the above configuration with parallel amplification also have the same advantage as that of this embodiment.

(Embodiment 3)

Figure 8:
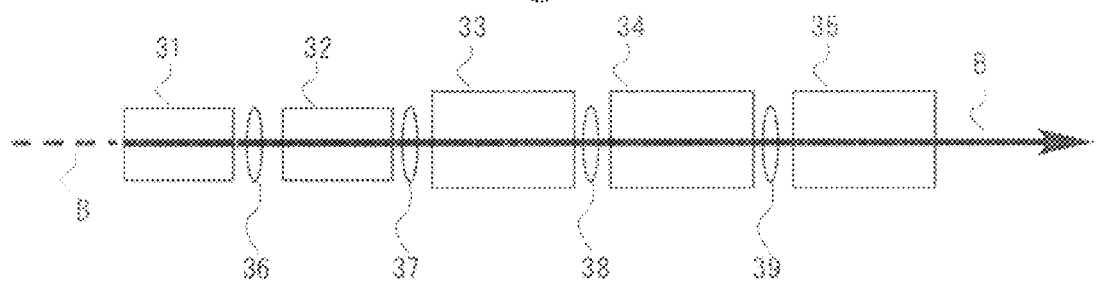
FIG. 8 is a block diagram illustrating an example of a pulsed $CO_2$ laser amplifying system according to Embodiment 3 of the present invention.

FIG. 8 is a diagram illustrating an example of a pulsed $CO_2$ laser amplifying system according to Embodiment 3 of the present invention. In FIG. 8, pulse amplifiers 31 and 32 are configured of the pulse amplifier described in Embodiment 2 and pulse amplifiers 33, 34, and 35 are configured of the pulse amplifier described in Embodiment 1.

The pulsed $CO_2$ laser light having an average output power of 10 W and a pulse width of 10 ns sequentially passes through the pulsed $CO_2$ laser amplifier 31, a laser beam shaping optical system 36, the pulsed $CO_2$ laser amplifier 32, a laser beam shaping optical system 37, the pulsed $CO_2$ laser amplifier 33, a laser beam shaping optical system 38, the pulsed $CO_2$ laser amplifier 34, a laser beam shaping optical system 39, and the pulsed $CO_2$ laser amplifier 35 to eventually become a $CO_2$ laser beam having an average output power of 20 kW. The laser beam shaping optical systems 36, 37, 38, and 39 serve to supply a laser beam of optimal beam size as described in Embodiments 1 and 2 to the following respective pulsed $CO_2$ laser amplifiers 32, 33, 34, and 35.

In Embodiment 3, the pulse amplifiers 31, 32, 33, 34, and 35 arranged in respective stages have the same sizes of the discharge region. Therefore, when comparing the pulse amplifier of Embodiment 2 (see FIG. 5) arranged in the preceding stage with the pulse amplifier of Embodiment 1 (see FIG. 1) arranged in the subsequent stage, the pulse amplifier of Embodiment 2 has a quarter cross section area of the laser beam and an approximately threefold interaction length between the laser beam and the medium (laser gas excited by discharge) with respect to the pulse amplifier of Embodiment 1.

In other words, assuming that the laser beam having the same power is amplified according to Embodiments 1 and 2, respectively, the pulse amplifier of Embodiment 2 would produce a fourfold light intensity of the laser beam with an approximately threefold interaction length between the laser beam and the medium (laser gas excited by discharge) with respect to the pulse amplifier of Embodiment 1.

Since the saturation intensity is 1 kW order in Embodiment 1 and 2, in case the pulsed amplifier amplifies a pulse having the average output power of 10 W order which is lower enough than the saturation intensity, the saturation of the gain is almost negligible. Therefore, the pulsed amplifier of Embodiment 2 having an approximately threefold interaction length exhibits an amplification factor several times higher with respect to the pulse amplifier of Embodiment 1.

On the other hand, in case the pulsed amplifier amplifies a laser beam having a power equal to or larger than the saturation intensity, the gain saturation has significant influence over the amplification, therefore, the pulsed amplifier of Embodiment 1 exhibits an amplification factor several times higher than the pulsed amplifier of Embodiment 2.

In this embodiment, the pulsed amplifier of Embodiment 2 which is suitable for amplification performance of a laser beam having a power of several tens watts-class is arranged in the preceding stage and the pulsed amplifier of Embodiment 1 which is suitable for amplification performance of a laser beam having a power of several kilowatts-class is arranged in the subsequent stage, thereby enhancing the efficiency of the total amplifying system.

Incidentally, although the amplifying system is configured of five pulsed amplifiers connected in series in this embodiment, any amplifiers which are configured of two or more amplifiers, including the amplifiers of Embodiments 1 and 2, connected in series also have the same advantage as that of this embodiment.

(Embodiment 4)

Figure 9:
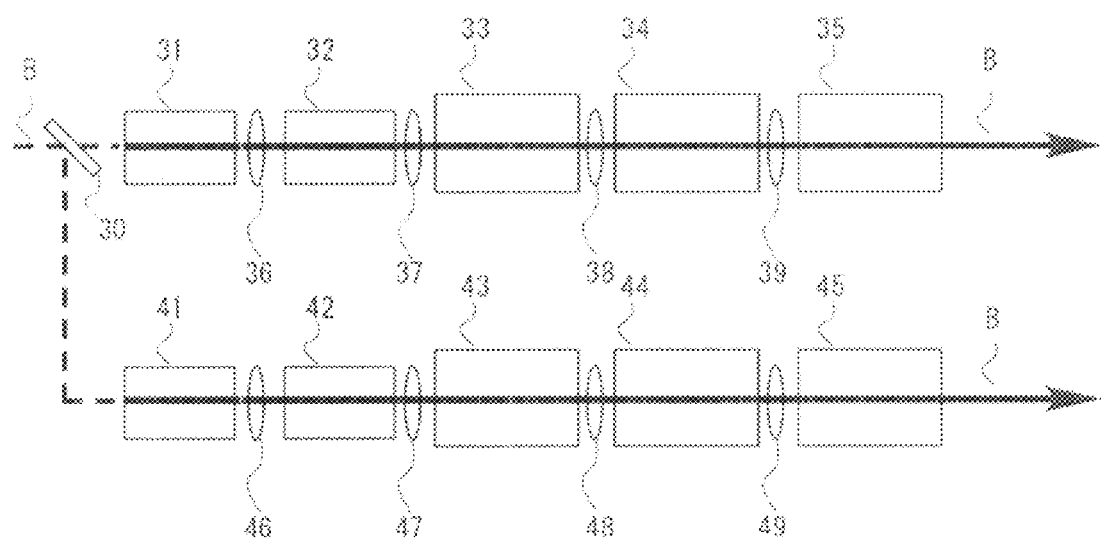
FIG. 9 is a block diagram illustrating an example of a pulsed $CO_2$ laser amplifying system according to Embodiment 4 of the present invention.

FIG. 9 is a diagram illustrating an example of a pulsed $CO_2$ laser amplifying system according to Embodiment 4 of the present invention. In FIG. 9, pulse amplifiers 31, 32, 41, and 42 are configured of the pulse amplifier described in Embodiment 2 and pulse amplifiers 33, 34, 35, 43, 44, and 45 are configured of the pulse amplifier described in Embodiment 1.

The pulsed $CO_2$ laser light having an average output power of 10 W and a pulse width of 10 ns enters a beam splitter 30 to be divided into two laser beams each having an output power of 5 W. One of the two laser beams sequentially passes through the pulsed $CO_2$ laser amplifier 31, a laser beam shaping optical system 36, the pulsed $CO_2$ laser amplifier 32, a laser beam shaping optical system 37, the pulsed $CO_2$ laser amplifier 33, a laser beam shaping optical system 38, the pulsed $CO_2$ laser amplifier 34, a laser beam shaping optical system 39, and the pulsed $CO_2$ laser amplifier 35 to eventually become a $CO_2$ laser beam having an average output power of about 20 kW. The rest of the two laser beams sequentially passes through the pulsed $CO_2$ laser amplifier 41, a laser beam shaping optical system 46, the pulsed $CO_2$ laser amplifier 42, a laser beam shaping optical system 47, the pulsed $CO_2$ laser amplifier 43, a laser beam shaping optical system 48, the pulsed $CO_2$ laser amplifier 44, a laser beam shaping optical system 49, and the pulsed $CO_2$ laser amplifier 45 to eventually become a $CO_2$ laser beam having an average output power of about 20 kW. The laser beam shaping optical systems 36, 37, 38, 39, 46, 47, 48, and 49 serve to supply a laser beam of an optimal diameter as described in Embodiments 1 and 2 to the following respective pulsed $CO_2$ laser amplifiers 32, 33, 34, 35, 42, 43, 44, and 45.

In Embodiment 4, the pulse amplifiers 31, 32, 33, 34, 35, 41, 42, 43, 44, and 45 arranged in respective stages have the same sizes of the discharge region. Therefore, when comparing the pulse amplifier of Embodiment 2 (see FIG. 5) arranged in the preceding stage with the pulse amplifier of Embodiment 1 (see FIG. 1) arranged in the subsequent stage, the pulse amplifier of Embodiment 2 has a quarter cross section area of the laser beam and an approximately threefold interaction length between the laser beam and the medium (laser gas excited by discharge) with respect to the pulse amplifier of Embodiment 1.

In other words, assuming that the laser beam having the same power is amplified according to Embodiments 1 and 2, respectively, the pulse amplifier of Embodiment 2 would produce a fourfold light intensity of the laser beam with an approximately threefold interaction length between the laser beam and the medium (laser gas excited by discharge) with respect to the pulse amplifier of Embodiment 1.

Since the saturation intensity is 1 kW order in Embodiment 1 and 2, in case the pulsed amplifier amplifies a pulse having the average output power of 10 W order which is lower enough than the saturation intensity, the saturation of the gain is almost negligible. Therefore, the pulsed amplifier of Embodiment 2 having an approximately threefold interaction length exhibits an amplification factor several times higher with respect to the pulse amplifier of Embodiment 1.

On the other hand, in case the pulsed amplifier amplifies a laser beam having a power equal to or larger than the saturation intensity, the gain saturation has significant influence over the amplification, therefore, the pulsed amplifier of Embodiment 1 exhibits an amplification factor several times higher than the pulsed amplifier of Embodiment 2.

In this embodiment, the pulsed amplifier of Embodiment 2 which is suitable for amplification performance of a laser beam having a power of several tens watts-class is arranged in the preceding stage and the pulsed amplifier of Embodiment 1 which is suitable for amplification performance of a laser beam having a power of several kilowatts-class is arranged in the subsequent stage, thereby enhancing the efficiency of the total amplifying system.

In this embodiment, although not illustrated in FIG. 9, a single oscillator produces a beam of pulsed laser light before amplification in FIG. 9, and then the laser beam is divided into two laser beams to be amplified in parallel. On the other hand, when two systems of Embodiment 3 are prepared, two oscillators are required. This embodiment can obtain two laser beams having the same output power, i.e., about 20 kW, as in the case where the two systems of Embodiment 3 are prepared, with the configuration having one oscillator less than the case where the two systems of Embodiment 3 are prepared. Since the oscillator includes an optical crystal, it is more expensive than the amplifier. This embodiment provides an inexpensive system than in the case where two systems of Embodiment 3 are prepared.

Although the amplifying system is configured of five amplifiers in series by two lines in parallel in this embodiment, any amplifiers which are configured of two or more amplifiers, including the amplifiers of Embodiments 1 and 2, connected in series or in parallel also have the same advantage as that of this embodiment.

EXPLANATORY NOTE

1 DISCHARGE TUBE
6a, 6b DISCHARGE ELECTRODE
11a, 11b DISCHARGE ELECTRODE
12a, 12b WINDOW
13 BLOWER
14 HEAT EXCHANGER
15a, 15b DUCT AND WINDOW HOLDER
16a, 16b DUCT
21a, 21b DISCHARGE ELECTRODE
22a, 22b WINDOW
23 BLOWER
24 HEAT EXCHANGER
25a, 25b DUCT AND WINDOW HOLDER
26a, 26b DUCT
27a, 27b MIRROR
29a, 29b DISCHARGE ELECTRODE
30 BEAM SPLITTER
31, 32, 33, 34, 35, 41, 42, 43, 44, 45 PULSED $CO_2$ LASER AMPLIFIER
36, 37, 38, 39, 46, 47, 48, 49 LASER BEAM SHAPING OPTICAL SYSTEM
B PULSED LASER LIGHT
Bc SHAPE OF BEAM CROSS SECTION
D DISCHARGE REGION
Dc SHAPE OF DISCHARGE CROSS SECTION
G GAS FLOW
Gc SHAPE OF CROSS SECTION OF GAS FLOW CHANNEL
L DISCHARGE LENGTH
P1, P2, P3 CENTER LINE OF LASER BEAM IN OPTICAL PATH

The invention claimed is:

1. A $CO_2$ gas laser device for amplifying $CO_2$ laser light which repeatedly oscillates in a short pulse having a pulse width of 100 ns or less, wherein a $CO_2$ laser gas which is excited by continuous discharge is cooled by circulating the gas by forced convection, the $CO_2$ gas laser device comprising:
  a plurality of amplifiers, wherein an angle θ defined by an optical axis of the amplified $CO_2$ laser light and a flow direction of the $CO_2$ laser gas caused by forced convection (0 degrees≤θ≤90 degrees) is determined by the following equation:

$$\theta \geq \arcsin(8/\pi \times \mathrm{sqrt}(S_D)/L),$$

wherein $S_D$ is a discharge cross sectional area of a volume in which the $CO_2$ laser gas is excited by discharge, and L is a discharge length of the volume, the plurality of amplifiers each including discharge electrodes which are opposite to each other, between which the $CO_2$ laser gas is interposed, the plurality of amplifiers including a first amplifier and a second amplifier, the first amplifier amplifies the $CO_2$ laser beam along a path which passes once through the $CO_2$ laser gas, the second amplifier amplifies the $CO_2$ laser beam along a folded path which passes at least twice through the $CO_2$ laser gas, wherein the laser beam passing through the second amplifier first makes contact with one discharge electrode, and then makes contact with another discharge electrode opposite to the one discharge electrode, and wherein the $CO_2$ gas laser device further comprises a shaping optical system for supplying the laser beam having a diameter which is equal to the length of the side of the discharge cross section, to the first amplifier.

2. The $CO_2$ gas laser device according to claim 1, wherein the second amplifier includes at least two optical paths, in which one optical path overlapping with the other optical path is shorter than another non-overlapping optical path, inside a medium residing in a single closed space.

3. The $CO_2$ gas laser device according to claim 1, wherein the $CO_2$ laser light is amplified while passing through the second amplifier and the first amplifier in this sequence.

* * * * *